United States Patent [19]

Black et al.

[11] Patent Number: 4,692,669
[45] Date of Patent: Sep. 8, 1987

[54] PICTURE TUBE SCREEN GRID POTENTIAL CONTROL

[75] Inventors: Karl-Heinz Black; Günter Schuchardt, both of Hildesheim, Fed. Rep. of Germany

[73] Assignee: Blaupunkt-Werke GmbH, Hildesheim, Fed. Rep. of Germany

[21] Appl. No.: 705,740

[22] Filed: Feb. 26, 1985

[30] Foreign Application Priority Data

Feb. 29, 1984 [DE] Fed. Rep. of Germany ....... 3407388

[51] Int. Cl.$^4$ .......................... H01J 29/52; H04N 5/68
[52] U.S. Cl. ..................................... 315/381; 315/383; 358/243
[58] Field of Search ............... 315/381, 383, 384, 411, 315/379, 30, 14, 385, 386; 358/219, 220, 243, 74; 361/88, 91

[56] References Cited

U.S. PATENT DOCUMENTS 4,042,858 8/1977 Collette et al. .
4,488,181 12/1984 Haferl .................................. 315/381

FOREIGN PATENT DOCUMENTS 1762716 8/1975 Fed. Rep. of Germany .
3240708 5/1984 Fed. Rep. of Germany .

Primary Examiner—Theodore M. Blum
Assistant Examiner—Gregory C. Issing
Attorney, Agent, or Firm—Frishauf, Holtz, Goodman & Woodward

[57] ABSTRACT

A transistor with its collector connected to a point near the screen grid in the resistor network which feeds voltage from the high voltage rectifier of a picture tube to the screen grid electrode and its emitter connected to ground has two control circuits connected to its base electrode. The first control circuit (56) is a threshold circuit responsive to a voltage proportional to the beam current of the picture tube for making the control transistor provide a short circuit between the picture tube screen grid and ground, and thereby preventing a burn-out when there is persistent excessive beam current. The second control circuit (58) acts on the base electrode of the control transistor to set the screen grid voltage of the picture tube at a desired value in normal operation, for example in accordance with the pulse width of a train of pulses of settable pulse width.

8 Claims, 6 Drawing Figures

PICTURE TUBE SCREEN GRID POTENTIAL CONTROL

The invention concerns a control circuit for a picture tube having a screen grid which is to be operated at an adjustable screen grid potential.

For the proper operation of a picture tube, for example in a television receiver or in a television or data display monitor, not only is it necessary to control the picture with the video signals, but also, among other things, to provide the picture tube with a high voltage, a focussing voltage for picture sharpness and a screen grid voltage for determining the operating point of the picture tube. These voltages are, as is known, generated in the high-voltage power supply circuit in connection with the horizontal sweep circuits, with the high-voltage power supply accordingly including the usual high-voltage transformer.

It is already known, after rectifying the high-voltage horizontal scan frequency oscillations to obtain the three above-named voltages on the secondary side of the high-voltage transformer by means of an ohmic voltage divider. The latter includes a potentiometer for the screen grid voltage, so that this voltage can be set at the desired value.

In the operation of a picture tube, it is necessary not only to provide adjustability for the screen grid voltage, but also to provide protective measures in this part of the circuit, in a known way, to prevent the burning of a spot on the screen of the picture tube. Thus, in the case of a defect of the final video stage for the video signals, it is possible that the picture tube might be damaged by the beam current rising above the highest permissible value of beam current.

A protective circuit of this kind has already been proposed in German Pat. No. 32 40 708.4 in which the voltage drop across a resistance provided in the beam current circuit is measured, and a threshold circuit provides a switch pulse when a critical value of voltage drop is exceeded. That pulse turns on a thyristor (i.e., an SCR), which short-circuits the screen grid voltage to ground. The turning off of the screen grid voltage suppresses the anode current or blocks the beam current, so that a burn-in spot on the screen is prevented.

The above-described circuit provisions for operation of a picture tube—namely, the possibility of adjusting the screen grid voltage, as well as the protective circuit—do make possible proper operation of the picture tube in a desired fashion, but there is nevertheless a disadvantage that the circuit cost is quite high. Along with the increased cost, there is also a certain vulnerability to electrical disturbances.

SUMMARY OF THE INVENTION

It is an object of the present invention to provide a circuit for picture tubes for control of the screen grid voltage which is less vulnerable to external disturbances and circumstances and is simple to manufacture and is distinguished by low cost.

Briefly, an active element, such as a transistor, which operates subject to a control voltage, is provided which, in response to the control voltage, will operate both to adjust an output voltage and also as an electronic switch. The invention makes use of the fact that an active semiconductor element, according to the control provided, can act both as an element for adjusting a voltage (by variation of its internal resistance) and also as an electronic switch. In this way a combination can be provided for two circuit functions, for which separate provisions were heretofore made.

The circuit according to the invention makes possible both the necessary adjustment of the screen grid voltage and also the utilization of the same circuit elements as a protective circuit for prevention of a burn spot on the screen of the tube. The circuit expense is advantageously reduced by the use of such a combination circuit utilizing a suitably controlled transistor, compared to the circuit expense previously incurred.

In order to make possible adjustment of the screen grid voltage, and thereby of the operating point of the picture tube, the transistor is inserted as a variable resistor after the fashion of the voltage divider principle, so that a variation of the resistance value of the resistor can be produced by a relatively small d.c. voltage supplied to the base of the transistor, this operation resulting in changing the screen grid voltage.

It should be mentioned at this point that there is a significant advantage in that a so-called "cold" adjustment of the screen grid voltage is involved in this case. By variation of a relatively small control voltage of only a few volts at the base of the transistor, it is possible in a simple way to carry out the adjustment of the high screen grid voltage (e.g., between 350 V and 850 V).

In the screen grid voltage adjustment of the kind mentioned in the introduction to this specification, performed with a potentiometer, the variation of the screen grid voltage is carried out directly at the top of the potentiometer, therefore at a very high electric potential.

The aging of the potentiometer used can, moreover, produce a change of the operating characteristic of the potentiometer, with the result that an undesired change of the screen voltage takes place. This problem is not found in the adjustment of the screen grid voltage by means of the transistor in accordance with the invention.

The transistor utilized in the circuit of the invention accordingly fulfills a double function in which operation is reliable both with regard to the protective circuit and with regard to the adjustment of the screen voltage.

The provision of the control voltage for the purpose of adjusting the screen grid voltage can, in a continued embodiment of the invention, take place by supplying pulses of variable width to a resistance-capicitance network of a control circuit. At the output of the RC network, a d.c. voltage is then made of available as the control voltage which depends upon the magnitude of the width (duration) of the pulses.

This solution has the particular advantage that it can be installed in the newer types of television receivers which utilize digital signal processing. In such a digital receiver, the necessary pulses are already directly available. An adjustment of the screen grid voltage, once made digitally, can be simply stored electronically so that the value of screen grid voltage is available and ready to be called out at any time. In addition, this embodiment permits a computer controlled trimming or calibration by checking or interrogating definitely specified measuring points of the television apparatus. Along with the reduced circuit expense and the combination of screen grid voltage adjustment and protective circuit, the invention thus offers the further advantage of easy incorporation in the course of increasing digitilization of television receivers.

BRIEF DESCRIPTION OF THE DRAWINGS

The invention is further described by way of illustrative example with reference to the annexed drawings, in which.

CIRCUITS HERETOFORE USED

Figure 1:
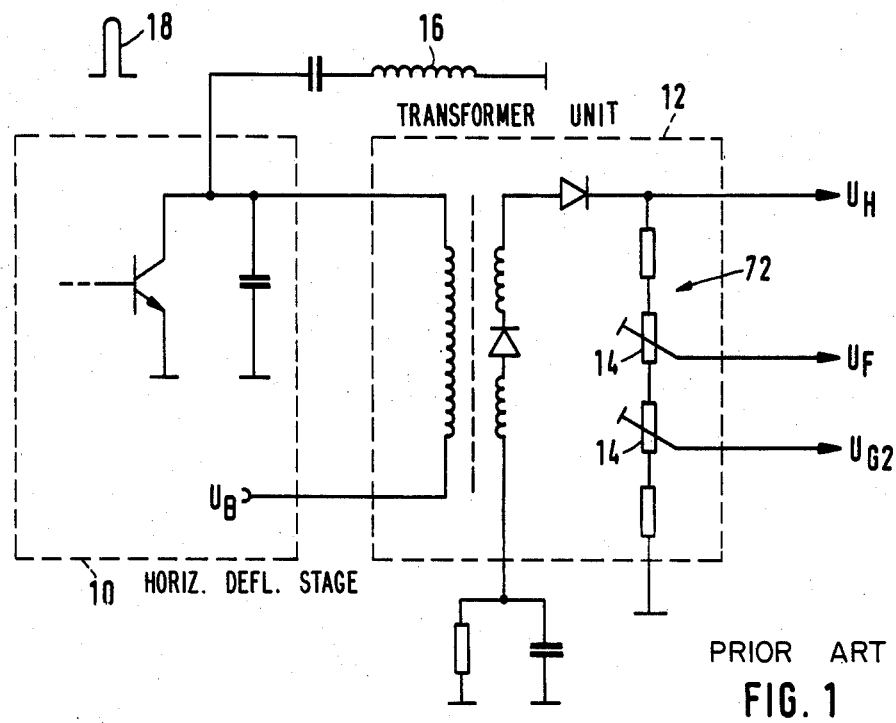
FIG. 1 is a basic diagram of a known circuit for adjusting the screen grid voltage of a picture tube.

FIG. 1 shows a known circuit for adjusting the screen grid voltage $U_{G2}$. A horizontal deflection stage 10 drives a diode-split-transformer 12, conventionally referred to as a DST, on the secondary side of which, after rectification by the diodes included in the transformer unit 12, the high d.c. voltage $U_H$ is obtained. The primary coil shown at the left in the transformer unit 12 is supplied with horizontal scan frequency pulses 18, and is also connected to a supply voltage $U_B$. The horizontal deflection coil 16 is also shown in FIG. 1.

An ohmic voltage divider 72 is connected between the high voltage $U_H$ and ground, and is provided with a double potentiometer control 14, by which the focus voltage $U_F$ and the screen grid voltage $U_{G2}$ can be independently adjusted. The circuit described up to this point is possible the necessary supply of voltage to a picture tube and especially the setting of the screen grid voltage $U_{G2}$.

Figure 2:
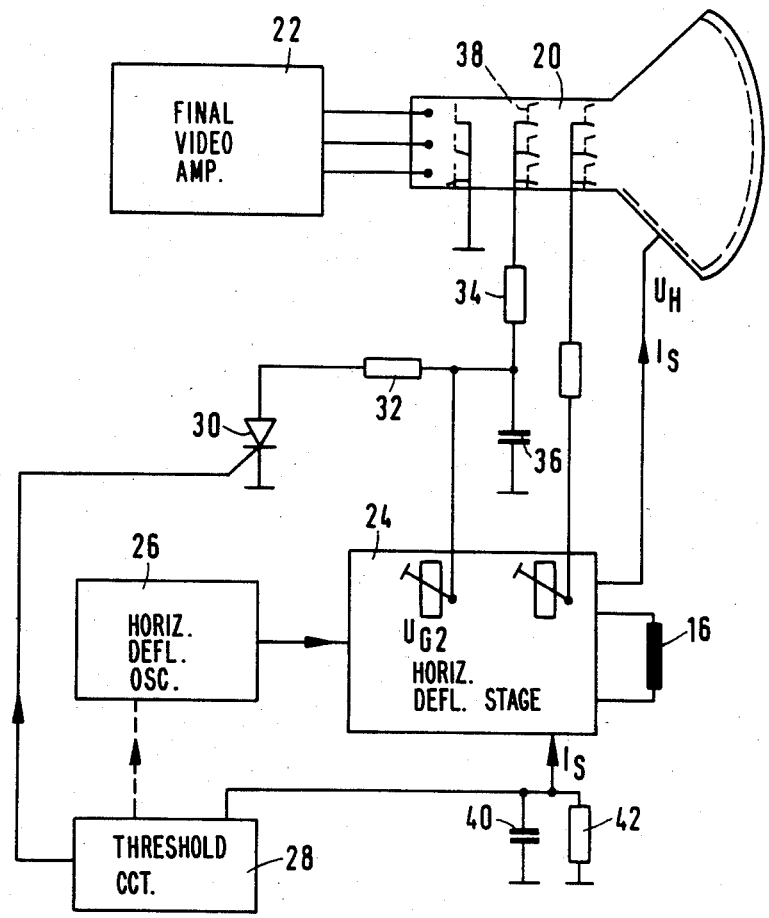
FIG. 2 is a basic diagram of a previously proposed protective circuit.

Undesirable burn spots can be prevented in a picture tube 20 by means of the protective circuit of the FIG. 2. As above described, the adjustable screen grid voltage $U_{G2}$ is obtained from a horizontal deflection final stage 24 and supplied over a resistance 34 to the screen grid 38. The horizontal deflection coil 16 is also supplied with current from the horizontal deflection final stage 24. A final video amplifier stage 22 is provided for control of the picture 20 by the signal voltage and a horizontal deflection oscillator 26 is provided for exciting the horizontal deflection final stage 24.

The essential components of the circuit according to FIG. 2 are a threshold circuit 28 and a thyristor (semiconductor controlled rectifier) 30 controlled thereby, which is connected through a resistance 32 with the voltage line for the screen grid 38. The connection point of the two resistances 32 and 34 is bypassed to ground by a capacitor 36.

A resistance 42 is provided for measuring the beam current $I_S$ and develops at its ungrounded end a voltage which is proportional to the beam current $I_S$. The resistance 42 is bridged by a capacitor 40 so as not to take any account of short duration excesses over the maximum permissible beam current—thus disregarding very small bright spots on the screen of the picture tube 20.

The voltage developed by the resistance 42 is supplied to the threshold circuit 28 so that at the instant $t_2$ (see FIG. 3) a pulse or a voltage step is produced which reaches the control electrode of the thyristor 30. The thyristor 30 becomes conducting and short circuits the screen grid $U_{G2}$ to ground. The resistance 32 here serves for limiting the current. As the result of the switched down screen voltage $U_{G2}$, the anode current of the picture tube 20 becomes so small so that it may be suitable to dispense with any switching off of the horizontal deflection (see the broken line between the threshold circuit 28 and the horizontal deflection oscillator 26).

Figure 3:
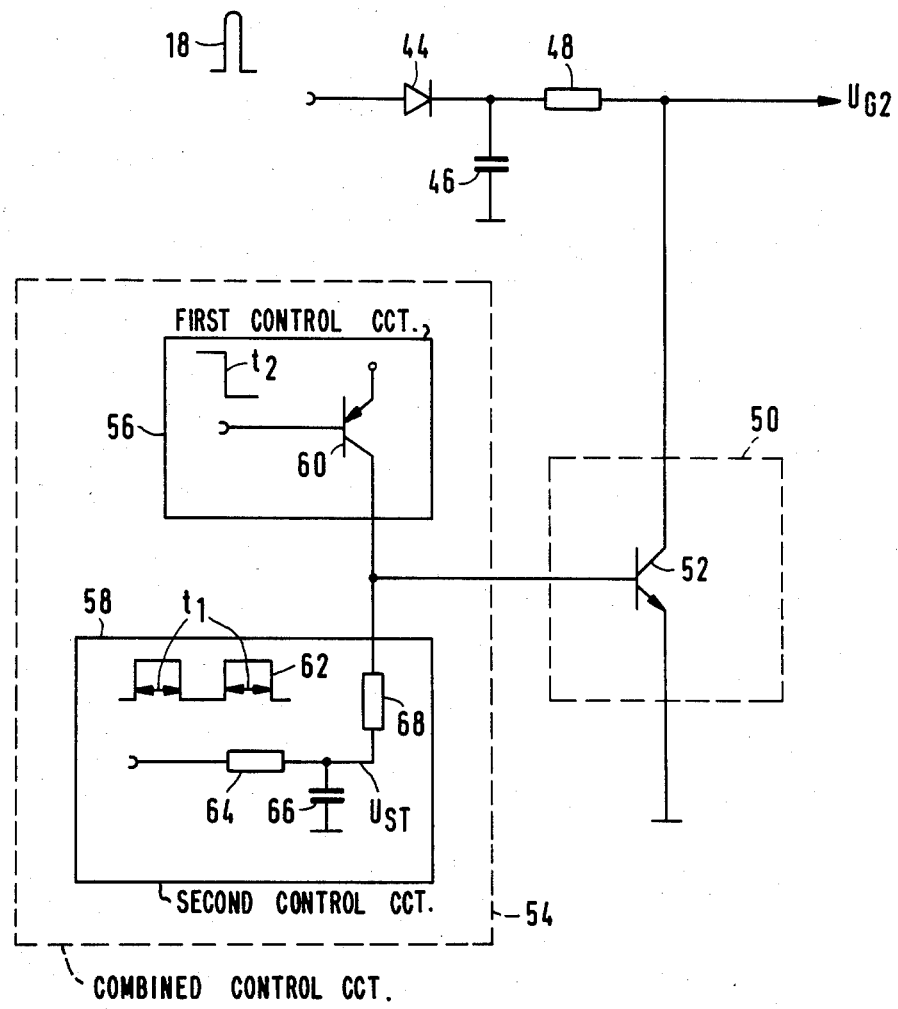
FIG. 3 is a circuit diagram of an embodiment of the invention.

Whereas in the circuits described up to this point the setting of the screen grid voltage $U_{G2}$ and the protective circuit just described are separated from each other, these functions are interconnected in the circuit of the invention according to FIG. 3 in a surprisingly simple manner, with a transistor 52 receiving a double function of electronic switch and voltage adjuster.

The adjustable screen grid voltage $U_{G2}$ is produced by rectification of horizontal pulses 18 by means of a diode 44 which operates in connection with a capacitance 46 and a series resistance 48. The end of the resistance 48 remote from the diode 44 is connected to an active element 50, in this case to the collector of the transistor 52. The emitter of the transistor 52 is grounded and a control voltage $U_{ST}$ is supplied from a control circuit 54.

Since the transistor 52 fulfills a double function in the case of the invention, both a first control circuit 56 and a second control circut 58 are provided for its operation, both these control circuits affecting in common the base of the transistor 52.

The first control circuit 56 contains a transistor 60. In other respects the first control circuit 56 can be constituted in a manner (not shown in FIG. 3) corresponding to the threshold circuit 28 described with reference to FIG. 2. Therefore, when the highest permissible value for the beam current $I_S$ is exceeded at the instant $t_2$, there arises a voltage step which switches on the transistor 52, as a consequence of which the screen grid voltage $U_{G2}$ is switched down. The first control circuit 56 is therefore only effective and of influence on the transistor 52 when the beam current $I_S$ exceeds a certain value.

A control voltage $U_{ST}$ is produced as a d.c. voltage by the second control circuit 58 which applies that voltage to the base of the transistor 2. In response to its base voltage, the transistor 52, which provides a part of a voltage divider, changes its internal resistance so that adjustment of the screen grid voltage $U_{G2}$ is made possible.

The second control circuit 58 shown in FIG. 3 has two resistances 64 and 68 connected in series, with their common connection point bypassed to ground by a capacitor 66. For producing the desired control voltage $U_{ST}$, pulses 62 are used having a pulse width $t_1$ which is variable. The control voltage $U_{ST}$ can be varied in response to the pulse width $t_1$ in order to vary or set the screen grid voltage $U_{G2}$.

Figure 4:
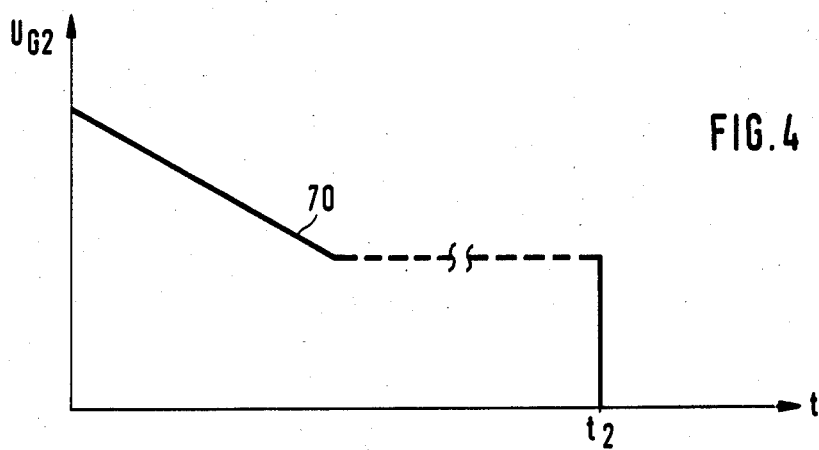
FIG. 4 is a graph for explaining the operation of the circuit of FIG. 3.

In the graph-type diagram given in FIG. 4 the voltage course 70 of the screen grid voltage $U_{G2}$ can be seen. The first obliquely running part shown at the left covers, for example, voltage values between 850 V and 350 V, these voltage values being set in response to the control voltage $U_{ST}$ and, consequently, in response to the value of the pulse width $t_1$. So long as the beam current $I_S$ does not exceed the permissible maximum value, so that the control circuit 56 is without effect on the transistor 52, the transistor is subjected only to the effect of the second control circuit 58. The generation, of the necessary control voltage $U_{ST}$ for the setting of the screen grid voltage $U_{G2}$ by means of the pulses 62, as just described, is especially of advantage for television receivers, monitors, etc. which have digital signal processing, since, in that case, the necessary pulses 62 are already directly available. The possibility is then offered, after a satisfactory adjustment of the screen grid voltage $U_{G2}$ to store the digital pulses necessary for that result, or their pulse widths, as digital values in a store from which they can be called out at any tme.

When during operation of the picture tube 20, the beam current $I_S$ exceeds its highest limit, the voltage step or jump at the instant $t_2$ already mentioned takes place and, as shown in FIG. 4, the screen grid voltage $U_{G2}$ is switched down in a desired manner in order to prevent the occurrence of a burn spot on the picture screen.

Figure 5:
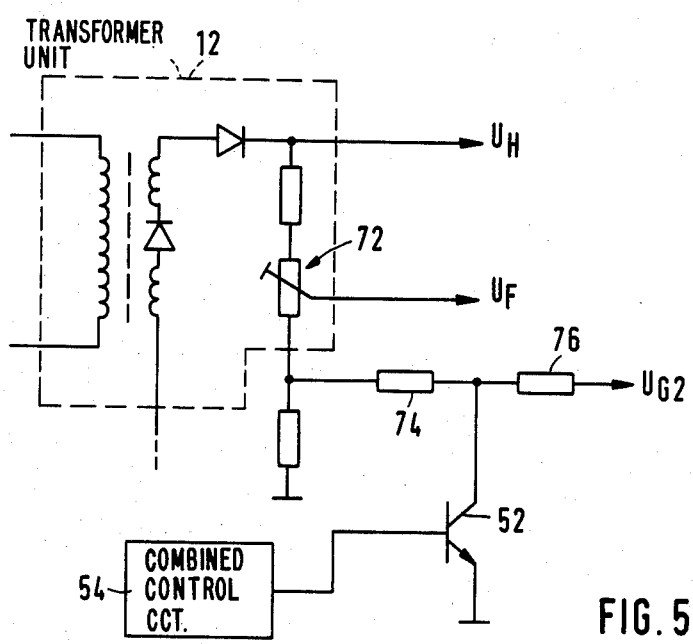
FIG. 5 is a diagram of another embodiment of circuit according to the invention.
Figure 6:
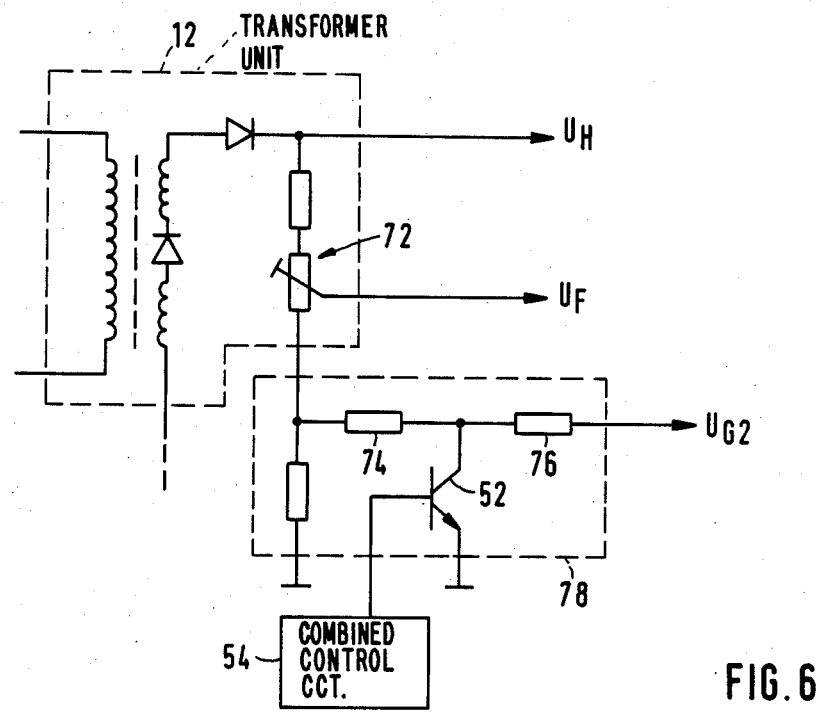
FIG. 6 is a circuit diagram of still another embodiment of circuit according to the invention.

Further illustrative embodiments of circuits according to the invention are shown in FIGS. 5 and 6. FIG. 5 differs from FIG. 3, where the adjustable screen grid voltage $U_{G2}$ is obtained in a so-called direct fashion by rectification of the horizontal pulses 18. In FIG. 5, in a manner comparable with FIG. 1, an ohmic voltage divider 72 is provided on the secondary side of the diode-split-transformer 12. From this voltage divider, the screen grid voltage $U_{G2}$ comes off through series resistances 74 and 76. The transistor 52 is interposed between ground and the common connection of these two last mentioned resistances. The base of the transistor 52 is connected to the control circuit 54. Merely the taking off of the voltage differs from FIG. 3, while the function of the circuit of the invention remains the same in other respects.

In FIG. 6 also, the voltage is taken off from the ohmic voltage divider 72 on the secondary side of the diode-split transformer 12. Here, however, the resistances 74 and 76 and also the transistor 54, are constituted as parts of a thick film circuit unit 78. The overall control circuit 54 containing the first control circuit 56 and the second control circuit 58, is located outside of the thick film circuit unit 78.

Although the invention has been described with reference to illustrative embodiments, it will be understood that the possible variations and modifications within the inventive concept are not limited to these embodiments.

We claim:

1. Electrode voltage control circuit for the screen grid of a picture tube interposed between a rectifier diode and said screen grid, said diode being interposed in circuit between a source of high voltage pules and said screen grid, said control circuit comprising;
    at least one resistance (48, 74) connected in series between said diode and said screen grid, said one resistance having a first terminal electrically nearer said diode and a second terminal electrically nearer said screen grid;
    a transistor (52) having its controlled path connected between ground and said second terminal of said resistance, said transistor also having a control electrode, and
    means connected to said control electrode of said transistor for maintaining the voltage normally applied to said screen grid at an adjustably pre-set value, for reducing the voltage applied to said screen grid to a low or zero value in response to a persistence of an excessive value of electron beam current in said picture tube and for allowing the voltage applied to said screen grid to rise to said pre-set value after said excessive value of electron beam current no longer persists, said means connected to said control electrode of said transistor including a first control branch circuit (56) and a second control branch circuit (58) which have their outputs connected together and to said control electrode of said transistor.

2. Control circuit according to claim 1, in which said transistor (52) has an emitter electrode connected to ground and a collector electrode connected to said second terminal of said resistance (48, 72).

3. Control circuit according to claim 1, in which said first control branch circuit (56) comprises a threshold value circuit and means for supplying thereto a voltage representative of the magnitude of the electron beam ($I_S$) of said picture tube (20).

4. Control circuit according to claim 1, in which said second control branch circuit (58) comprises a resistance-capacitance network (64, 66) and means for supplying thereto pulses having a pulse width ($t_1$) which is variable by an adjustable setting.

5. Control circuit according to claim 3, in which said second control branch circuit (58) comprises a resistance-capacitance network (64, 66) and means for supplying thereto pulses having a pulse width ($t_1$) which is variable by an adjustable setting.

6. Circuit according to claim 1, in which a resistance voltage divider is connected between said diode and ground and said one resistance (74) connected in series between said diode and said screen grid is connected between a tap on said voltage divider and an electrode of said transistor.

7. Control circuit according to claim 6, in which an additional series resistance (76) is connected between said electrode of said transistor and said screen grid of said picture tube.

8. Control circuit according to claim 6, in which said transistor (52), at least part of said voltage divider (72) and a resistance (74) connected between said voltage divider and said electrode of said transistor form at least part of a thick film circuit unit (78).

* * * * *